United States Patent
Noguchi et al.

(10) Patent No.: US 11,364,933 B2
(45) Date of Patent: Jun. 21, 2022

(54) VEHICLE CONTROL SYSTEM

(71) Applicant: HONDA MOTOR CO., LTD., Tokyo (JP)

(72) Inventors: Junpei Noguchi, Wako (JP); Masahiro Kowada, Wako (JP); Tomonobu Goto, Wako (JP); Miki Tsujino, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 134 days.

(21) Appl. No.: 16/830,997

(22) Filed: Mar. 26, 2020

(65) Prior Publication Data
US 2020/0307626 A1 Oct. 1, 2020

(30) Foreign Application Priority Data
Mar. 29, 2019 (JP) .............................. JP2019-068031

(51) Int. Cl.
*B60W 60/00* (2020.01)
*B60W 50/08* (2020.01)
*B60W 50/14* (2020.01)

(52) U.S. Cl.
CPC ........ *B60W 60/001* (2020.02); *B60W 50/082* (2013.01); *B60W 50/14* (2013.01); *B60W 2050/146* (2013.01)

(58) Field of Classification Search
CPC .... B60W 50/082; B60W 30/18; B60W 60/00; B60W 60/001; G05D 1/0016; G05D 1/0238; G06F 3/04883; G06F 1/1626; B62D 15/027
See application file for complete search history.

(56) References Cited

U.S. PATENT DOCUMENTS

| 10,019,001 | B2 * | 7/2018 | Dang Van Nhan .. B62D 15/027 |
| 2009/0309970 | A1 * | 12/2009 | Ishii ..................... B62D 15/027 348/143 |
| 2021/0009392 | A1 * | 1/2021 | Kamiya ............... G05D 1/0238 |

FOREIGN PATENT DOCUMENTS

| CN | 103348296 A | * 10/2013 | ............ B60W 30/18 |
| DE | 102014108486 A1 | * 7/2015 | ......... G06F 3/04883 |
| EP | 2394205 B1 | * 12/2013 | ........... G05D 1/0016 |
| EP | 3388930 A1 | * 10/2018 | ........... G06F 1/1626 |
| JP | 2017517903 A | 6/2017 | |

* cited by examiner

*Primary Examiner* — Yuri Kan
(74) *Attorney, Agent, or Firm* — Armstrong Teasdale LLP

(57) ABSTRACT

A vehicle control system includes: a terminal configured to be carried by a user; and a control device configured to execute remote autonomous moving processing to move a vehicle from an initial position to a stop position. The terminal includes: a touch panel configured to display an acceptance area that accepts a prescribed repetitive operation performed for continuing traveling of the vehicle and to display a suspension icon that accepts an operation performed for stopping the vehicle; and a processing unit configured to make the touch panel display the suspension icon at a part where the repetitive operation has been performed when the repetitive operation is stopped. When the control device or the processing unit determines that the suspension icon is operated or that the repetitive operation is not resumed within a prescribed period after the repetitive operation has been stopped, the control device stops the vehicle.

5 Claims, 5 Drawing Sheets rear ←→ front rear ←→ front

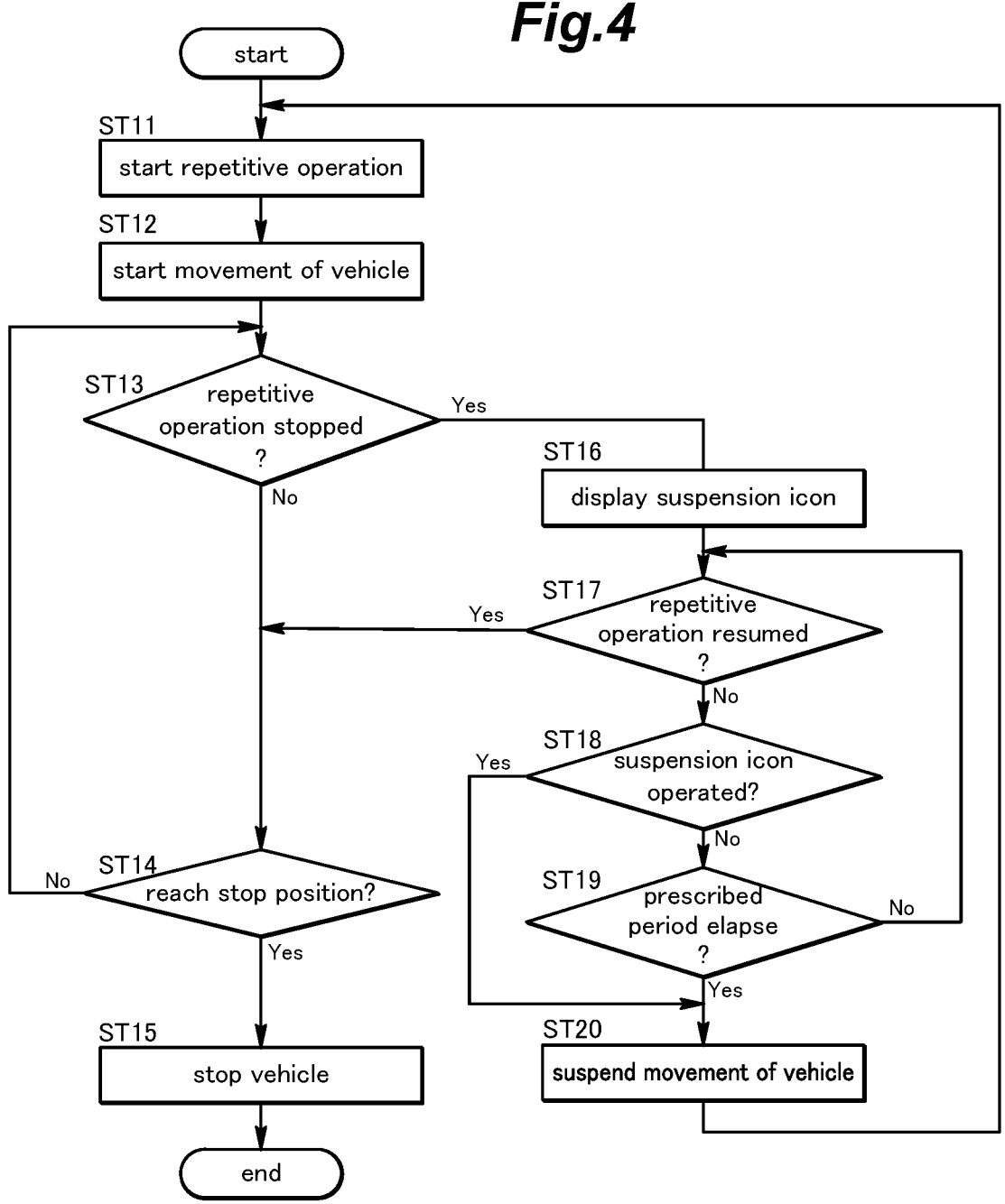

VEHICLE CONTROL SYSTEM

TECHNICAL FIELD

The present invention relates to a vehicle control system that can execute remote autonomous moving processing of a vehicle by using a terminal carried by a user.

BACKGROUND ART

A known vehicle control system executes remote autonomous moving processing to move a vehicle to a parking position by a remote operation as a user operates an operation terminal outside the vehicle. The operation terminal sends a signal indicating an instruction inputted by the user to a control device provided in the vehicle. For example, the signal indicates an instruction to start, to continue, and to stop traveling of the vehicle. The control device computes a trajectory (traveling route) of the vehicle to the parking position and makes the vehicle travel along the trajectory when the control device receives the signal from the operation terminal.

During the remote autonomous moving processing as described above, it is desirable that the user should stay around the vehicle to monitor it. For example, JP2017-517903A discloses that the movement of a vehicle is continued during a remote autonomous moving processing when a user continues a repetitive operation (for example, reciprocation of a finger) on a touch screen of an operation terminal, and the movement of the vehicle is stopped when the user stops the repetitive operation. In order to continue the movement of the vehicle, the user needs to continue the repetitive operation (i.e. the vehicle needs to continue receiving the signal about the user's repetitive operation). Therefore, the user needs to stay around the vehicle while performing the remote autonomous moving processing.

In the above remote autonomous moving processing, when the user stops the repetitive operation, the vehicle is stopped. For example, in a case where the user stops the repetitive operation unconsciously when the user is spoken to by others, the vehicle may be stopped even though the user does not intend to stop the vehicle. If the vehicle is stopped unnecessarily in this way, the period to complete the remote autonomous moving processing may become longer. On the other hand, if the user does not need to perform the repetitive operation during the remote autonomous moving processing, the user may move away from the vehicle before the remote autonomous moving processing is completed.

SUMMARY OF THE INVENTION

In view of such a problem of the prior art, a primary object of the present invention is to provide a vehicle control system that can execute remote autonomous moving processing such that the user needs to stay around the vehicle, the vehicle can be stopped by the user's operation, and the vehicle can be prevented from stopping due to an operation error by the user.

To achieve such an object, one embodiment of the present invention provides a vehicle control system (1) that includes a terminal (3) configured to be carried by a user; and a control device (15) configured to execute remote autonomous moving processing to move a vehicle (V) from an initial position to a stop position and to stop the vehicle at the stop position in response to an instruction from the terminal, wherein the terminal includes: a touch panel (30) configured to display an acceptance area (61) that accepts a prescribed repetitive operation performed for continuing traveling of the vehicle by the remote autonomous moving processing and to display a suspension icon (63) that accepts an operation performed for stopping the vehicle during the remote autonomous moving processing; and a processing unit (33) configured to make the touch panel display the suspension icon at a part where the repetitive operation has been performed when the repetitive operation is stopped, and when the control device or the processing unit determines that the suspension icon is operated or that the repetitive operation is not resumed within a prescribed period after the repetitive operation has been stopped, the control device stops the vehicle.

According to this arrangement, in order to continue traveling of the vehicle by the remote autonomous moving processing, the user needs to continue the repetitive operation and to stay around the vehicle. The user can stop the vehicle by operating the suspension icon or stopping the repetitive operation for the prescribed period. Further, even if the user stops the repetitive operation by mistake, the vehicle does not stop and the user can continue moving the vehicle to the stop position by resuming the repetitive operation within the prescribed period. Therefore, it is possible to prevent the vehicle from being stopped due to an operation error by the user.

Preferably, the processing unit is configured to make the touch panel display an input screen on which the user inputs the stop position, and to send information about the stop position input by the user to the control device.

According to this arrangement, the user can input the stop position by using the terminal, so that the user can identify the stop position without entering the vehicle. Therefore, for example, it is possible to move the vehicle parked at a position with no space to open the doors on the left and right, so that the vehicle control system can be more convenient for the user.

Preferably, the repetitive operation is a sliding operation on the touch panel by an operation part (62) moved by the user.

According to this arrangement, the control device or the processing unit can determine that the repetitive operation is stopped when the operation part such as a user's finger or a stylus separates from the touch panel or when the operation part is stopped on the touch panel. The sliding operation is an operation to move the operation part continuously on the touch panel, and does not include any operation to separate the operation part from the touch panel. Therefore, the control device or the processing unit can determine that the repetitive operation is stopped as soon as the operation part separates from the touch panel.

Preferably, the control device or the processing unit determines that the repetitive operation is stopped when the operation part is stopped on the touch panel, and then determines that the suspension icon is operated when the operation part abuts against the suspension icon after separating from the touch panel or when pressure applied to the suspension icon by the operation part increases.

According to this arrangement, it is possible to easily determine whether the repetitive operation is stopped and whether the suspension icon is operated.

Preferably, the control device or the processing unit determines that the repetitive operation is stopped when the operation part separates from the touch panel, and then determines that the suspension icon is operated when the operation part abuts against the suspension icon.

According to this arrangement, it is possible to easily determine whether the repetitive operation is stopped and whether the suspension icon is operated.

Thus, according to one embodiment of the present invention, it is possible to provide a vehicle control system that can execute remote autonomous moving processing such that the user needs to stay around the vehicle, the vehicle can be stopped by the user's operation, and the vehicle can be prevented from stopping due to an operation error by the user.

BRIEF DESCRIPTION OF THE DRAWINGS

FIG. 4 is a flow chart of moving processing in the vehicle control system according to the embodiment of the present invention;

DESCRIPTION OF THE PREFERRED EMBODIMENT(S)

Figure 1:
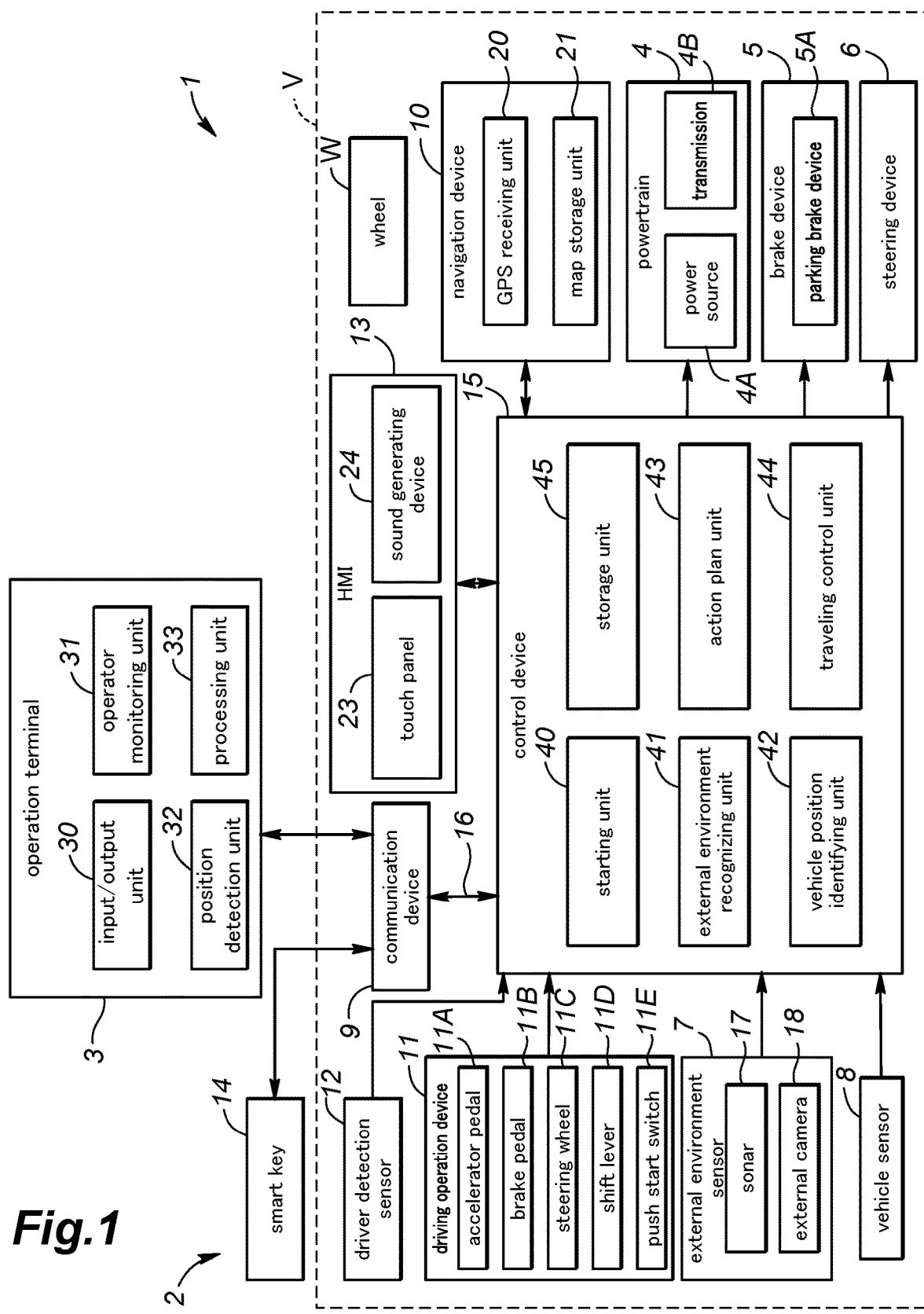
FIG. 1 is a functional block diagram of a vehicle control system according to an embodiment of the present invention.

As shown in FIG. 1, the vehicle control system 1 includes a vehicle system 2 and at least one operation terminal 3. The vehicle system 2 includes a powertrain 4, a brake device 5, a steering device 6, an external environment sensor 7, a vehicle sensor 8, a communication device 9, a navigation device 10, a driving operation device 11, a driver detection sensor 12, an HMI 13, a smart key 14, and a control device 15. The above components of the vehicle system 2 are connected to each other by communication means such as a controller area network 16 (CAN) so that a signal can be transmitted between the above components. The above components of the vehicle system 2 except the smart key 14 are mounted to the vehicle V.

The powertrain 4 is a device that applies a driving force to the vehicle V. The powertrain 4 includes a power source 4A and a transmission 4B, for example. The power source 4A includes at least one of an internal combustion engine such as a gasoline engine and a diesel engine and an electric motor. The brake device 5 is a device that applies a brake force to the vehicle V. For example, the brake device 5 includes a brake caliper that presses a brake pad against a brake rotor and an electric cylinder that supplies an oil pressure to the brake caliper. The brake device 5 includes a parking brake device 5A that restricts rotations of wheels W via wire cables. The steering device 6 is a device for changing a steering angle of the wheels W. For example, the steering device 6 includes a rack-and-pinion mechanism that steers (turns) the wheels W and an electric motor that drives the rack-and-pinion mechanism. The powertrain 4, the brake device 5, and the steering device 6 are controlled by the control device 15.

The external environment sensor 7 is a sensor that detects electromagnetic waves, sound waves, and the like from the periphery of the vehicle V to detect an object outside the vehicle V. The external environment sensor 7 includes sonars 17 and external cameras 18. The external environment sensor 7 may further include a millimeter wave radar or a laser lidar. The external environment sensor 7 outputs a detection result to the control device 15.

Figure 2A:
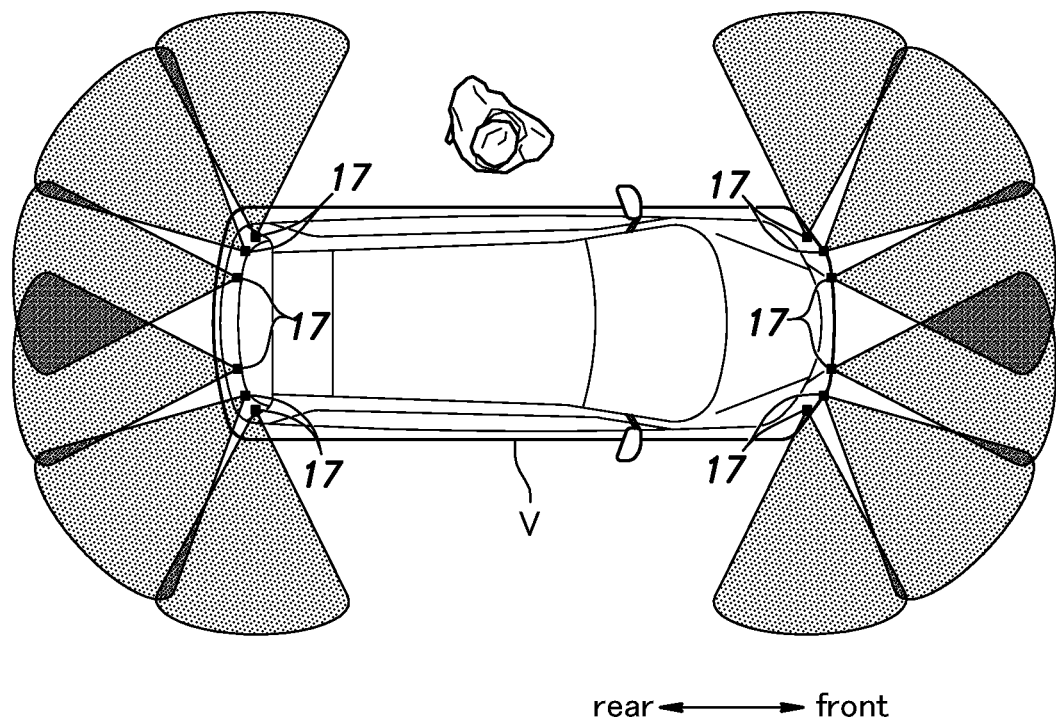
FIG. 2A is a schematic plan view showing sonars provided in a vehicle and detection areas of the sonars in the vehicle control system according to the embodiment of the present invention.

Each sonar 17 consists of a so-called ultrasonic sensor. Each sonar 17 emits ultrasonic waves around the vehicle V and captures the ultrasonic waves reflected by the object to detect a position (distance and direction) of the object. As shown in FIG. 2A, a plurality of sonars 17 are provided at a rear part and a front part of the vehicle V, respectively. In the present embodiment, two pairs of sonars 17 are provided on left and right sides of a rear bumper, two pairs of sonars 17 are provided on left and right sides of a front bumper, and one pair of sonars 17 are provided at front and rear ends of each of left and right faces of the vehicle V. That is, the vehicle V is provided with six pairs of sonars in total. In FIG. 2A, detection areas of the sonars 17 are colored. The sonars 17 provided on the rear bumper mainly detect a position of an object behind the vehicle V. The sonars 17 provided on the front bumper mainly detect a position of an object in front of the vehicle V. The sonars 17 provided at the front ends of the left and right faces of the vehicle V detect a position of an object on left and right outsides of the front end of the vehicle V, respectively. The sonars 17 provided at the rear ends of the left and right faces of the vehicle V detect a position of an object on left and right outsides of the rear end of the vehicle V, respectively.

Figure 2B:
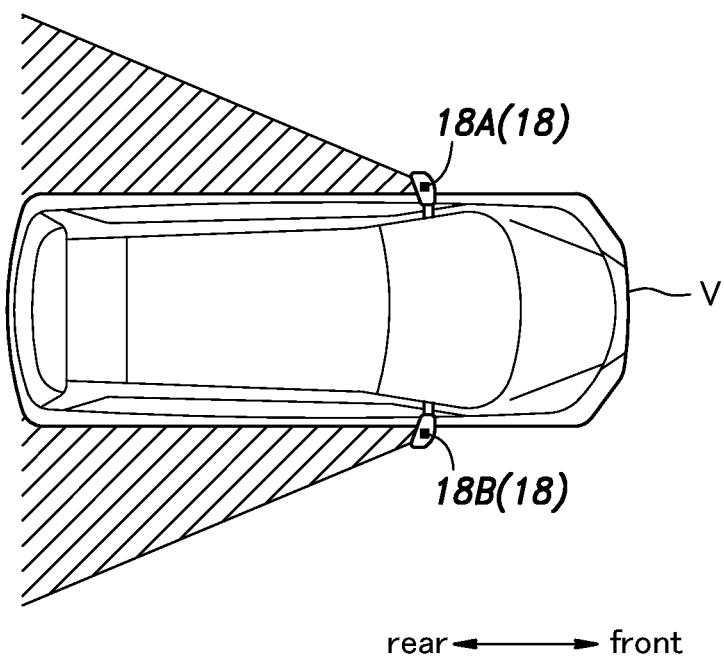
FIG. 2B is a schematic plan view showing door mirror cameras provided in the vehicle and image capturing areas of the door mirror cameras in the vehicle control system according to the embodiment of the present invention.

The external cameras 18 are devices that capture images around the vehicle V. Each external camera 18 consists of a digital camera using a solid imaging element such as a CCD or a CMOS, for example. The external cameras 18 include a front camera that captures an image of the front of the vehicle V and a rear camera that captures an image of the rear of the vehicle V. As shown in FIG. 2B, the external cameras 18 include a pair of left and right door mirror cameras 18A, 18B that are provided in the vicinity of the door mirrors of the vehicle V to capture images behind left and right sides of the vehicle V. In FIG. 2B, image capturing areas (detection areas) of the door mirror cameras 18A, 18B are hatched. The external cameras 18 may include a pair of left and right pillar cameras provided on center pillars (B pillars) of the vehicle V to capture images of left and right outsides of the vehicle V.

The vehicle sensor 8 includes a vehicle speed sensor that detects the speed of the vehicle V, an acceleration sensor that detects the acceleration of the vehicle V, a yaw rate sensor that detects the angular velocity around a vertical axis of the vehicle V, and a direction sensor that detects the direction of the vehicle V. For example, the yaw rate sensor consists of a gyro sensor.

The communication device 9 mediates (relays) wireless communication between the control device 15 and the operation terminal 3. Thereby, the control device 15 can communicate with the operation terminal 3 carried by the user via the communication device 9. The communication device 9 may utilize a known communication method such as infrared communication or Bluetooth (registered trademark), for example.

The navigation device 10 is a device that obtains a current position of the vehicle V and provides route guidance to a destination and the like. The navigation device 10 includes a GPS receiving unit 20 and a map storage unit 21. The GPS receiving unit 20 identifies a position (latitude and longitude) of the vehicle V based on a signal received from an artificial satellite (positioning satellite). The map storage unit 21 consists of a known storage device such as a flash memory or a hard disk, and stores map information.

The driving operation device 11 is provided in a vehicle cabin of the vehicle V and accepts an input operation (driving operation) by the driver (user) to control the vehicle V. The driving operation device 11 includes an accelerator pedal 11A, a brake pedal 11B, a steering wheel 11C, a shift lever 11D, and a push start switch 11E (engine start button). The push start switch 11E accepts a starting operation of the vehicle V (input operation to start operation of the vehicle V) by the driver. The driving operation device 11 may further include an element to activate the parking brake device 5A. The driving operation device 11 includes a sensor that detects an operation amount of the input operation, and outputs a signal indicating the operation amount of the input operation to the control device 15.

The driver detection sensor 12 is a sensor to detect that the driver (user) is sitting on a driver's seat. For example, the driver detection sensor 12 consists of a seat sensor provided on a seat surface of the driver's seat. The seat sensor may consist of a capacitance-type sensor to detect a change in capacitance, or may consist of a membrane-type switch that is turned on when the driver sits on the driver's seat. Alternatively, the driver detection sensor 12 may consist of an indoor camera that captures an image of the driver sitting on the driver's seat. Alternatively, the driver detection sensor 12 may consist of a seat belt sensor to detect that the driver fastens a seat belt of the driver's seat based on information as to whether a tongue of the seat belt is inserted into a buckle thereof. The driver detection sensor 12 outputs a detection result to the control device 15.

The HMI 13 notifies the user of various kinds of information by a display or a voice, and accepts an input operation by the user. For example, the HMI 13 includes a touch panel 23 that accepts the input operation by the user and a sound generating device 24 such as a buzzer and a speaker. The touch panel 23 includes a liquid crystal display, an organic EL display, and the like.

The control device 15 consists of an electronic control device (ECU) that includes a CPU, a nonvolatile memory such as a ROM, a volatile memory such as a RAM, and the like. The CPU executes operation processing according to a program so that the control device 15 executes various types of vehicle control. The control device 15 may be composed of one piece of hardware, or may be composed of a unit including plural pieces of hardware. Further, the functions of the control device 15 may be at least partially executed by hardware such as an LSI, an ASIC, and an FPGA, or may be executed by a combination of software and hardware.

The smart key 14 (FOB key) is a known wireless terminal that can be carried by the user. The smart key 14 can communicate with the control device 15 from outside the vehicle V via the communication device 9. The smart key 14 includes a button to accept input by the user. The user can release a door lock and start the operation of the vehicle V by operating the button of the smart key 14.

The operation terminal 3 consists of a wireless terminal that can be carried by the user, and can communicate with the control device 15 from outside the vehicle V via the communication device 9. In the present embodiment, the operation terminal 3 consists of a smartphone. A prescribed application is installed on the operation terminal 3 in advance so that the operation terminal 3 can communicate with the control device 15. The operation terminal 3 is provided with a terminal ID, which is a prescribed numerical value to identify the operation terminal 3.

As shown in FIG. 1, the operation terminal 3 includes an input/output unit 30, an operator monitoring unit 31, a position detection unit 32, and a processing unit 33.

The input/output unit 30 provides information to the user operating the operation terminal 3, and accepts input by the user operating the operation terminal 3. The input/output unit 30 consists of a touch panel, for example. When the input/output unit 30 accepts the input by the user, the input/output unit 30 outputs a signal corresponding to the input to the processing unit 33.

The operator monitoring unit 31 is a unit that captures an image of the user operating the operation terminal 3. The operator monitoring unit 31 consists of a digital camera using a solid imaging element such as a CMOS, for example. The operator monitoring unit 31 is provided at a position to capture an image of a face including eyes of the user performing the input to the input/output unit 30.

The position detection unit 32 obtains positional information of the operation terminal 3. The position detection unit 32 may obtain the positional information of the operation terminal 3 by receiving a signal from a geodetic satellite (GPS satellite), for example. Alternatively, the position detection unit 32 may obtain information about a position of the operation terminal 3 relative to the vehicle V by communicating with the control device 15 via the communication device 9. The position detection unit 32 outputs the obtained positional information of the operation terminal 3 to the processing unit 33.

The processing unit 33 sends the control device 15 the signal from the input/output unit 30, the image of the user captured by the operator monitoring unit 31, and the positional information of the operation terminal 3 obtained by the position detection unit 32. Also, when the processing unit 33 receives a signal from the control device 15, the processing unit 33 processes the signal from the control device 15 and makes the input/output unit 30 provide information to the user operating the operation terminal 3. The input/output unit 30 may provide the information to the user by displaying the information thereon, for example.

The control device 15 can start the operation of the vehicle V (namely, the driving of the powertrain 4) based on a signal from the operation terminal 3. Also, the control device 15 can move the vehicle V to a prescribed position and park the vehicle V there based on a signal from the operation terminal 3. To control the vehicle V at this time, the control device 15 at least includes a starting unit 40, an external environment recognizing unit 41, a vehicle position identifying unit 42, an action plan unit 43, a traveling control unit 44, and a storage unit 45.

The starting unit 40 executes authentication of the smart key 14 based on a signal from the push start switch 11E included in the driving operation device 11. Also, the starting unit 40 determines whether the smart key 14 is located in the vehicle V. In a case where the authentication of the smart key 14 succeeds and the starting unit 40 determines that the smart key 14 is located inside the vehicle V, the starting unit 40 starts the driving of the powertrain 4 (namely, the starting unit 40 starts the operation of the vehicle V). Also, in a case where the control device 15 receives a signal that instructs a start of the operation of the vehicle V from the operation terminal 3, the starting unit 40 executes authentication of the operation terminal 3. In a case where the authentication of the operation terminal 3 succeeds, the starting unit 40 starts the driving of the powertrain 4 (namely, the starting unit 40 starts the operation of the vehicle V). In a case where the powertrain 4 includes an internal combustion engine, the starting unit 40 turns on an ignition device when the starting unit 40 starts the driving of the powertrain 4.

The external environment recognizing unit 41 recognizes an obstacle (for example, a parked vehicle or a wall) located around the vehicle V based on the detection result of the external environment sensor 7, and thereby obtains information about the obstacle. Further, the external environment recognizing unit 41 analyzes an image captured by the external cameras 18 based on a known image analysis method such as pattern matching, and thereby determines whether the obstacle is present and obtains the size of the obstacle in a case where the obstacle is present. Further, the external environment recognizing unit 41 may compute a distance to the obstacle based on signals from the sonars 17 to obtain the position of the obstacle.

The vehicle position identifying unit 42 identifies the position of the vehicle V based on a signal from the GPS receiving unit 20 of the navigation device 10. Further, the vehicle position identifying unit 42 may obtain the vehicle speed and yaw rate of the vehicle V from the vehicle sensor 8, in addition to the signal from the GPS receiving unit 20, to identify the position and posture of the vehicle V by so-called inertial navigation.

The external environment recognizing unit 41 analyzes the detection result of the external environment sensor 7 (more specifically, the images captured by the external cameras 18) based on a known image analysis method such as pattern matching, and thereby recognizes a position of a white line on a road surface of a parking area, for example.

The traveling control unit 44 controls the powertrain 4, the brake device 5, and the steering device 6 based on a traveling control instruction from the action plan unit 43 to make the vehicle V travel.

The storage unit 45 consists of a RAM and the like, and stores information necessary for executing processing of the action plan unit 43 and the traveling control unit 44.

When the HMI 13 or the operation terminal 3 accepts an input by the user, the action plan unit 43 computes a trajectory (traveling route) of the vehicle V and outputs the traveling control instruction to the traveling control unit 44, if necessary.

Figure 3:
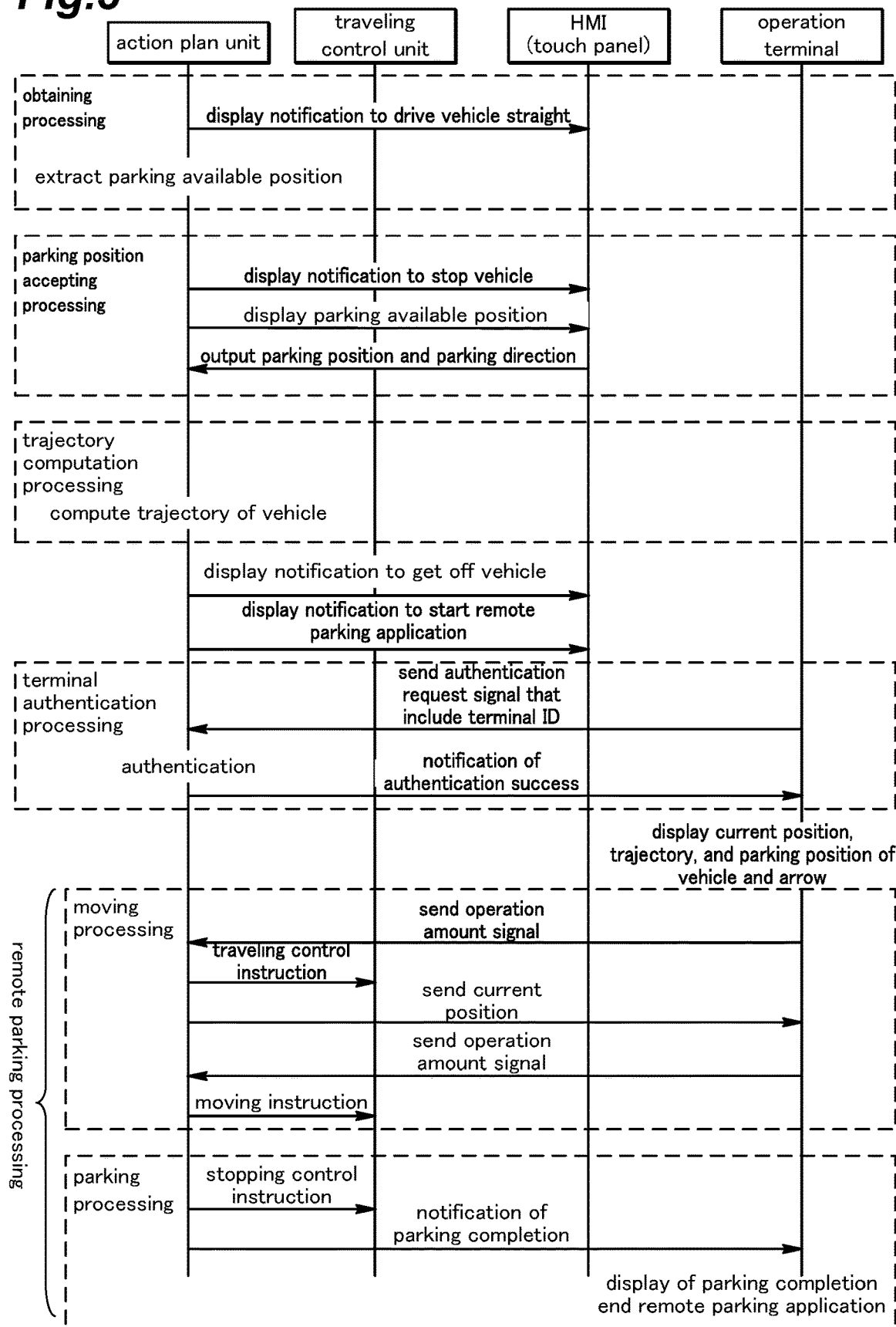
FIG. 3 is a sequence diagram of parking assist processing in the vehicle control system according to the embodiment of the present invention.

After the vehicle V has stopped, the action plan unit 43 executes parking assist processing, when the user performs an input corresponding to desire for parking assistance (remote parking assistance) by a remote operation. In the following, the parking assist processing will be described with reference to a sequence diagram of FIG. 3.

First, the action plan unit 43 executes obtaining processing to obtain at least one space to park the vehicle V (hereinafter referred to as "parking available position"). Specifically, the action plan unit 43 makes the touch panel 23 of the HMI 13 display a notification that instructs the driver to drive the vehicle V straight. While the driver is driving the vehicle V straight, the action plan unit 43 obtains the position and size of the obstacle and the position of the white line on the road surface based on the signal from the external environment sensor 7. The action plan unit 43 extracts the at least one parking available position based on the position and size of the obstacle and the position of the white line.

Next, the action plan unit 43 executes parking position accepting processing to accept a selection of a position to park the vehicle V (hereinafter referred to as "parking position") from the at least one parking available position. More specifically, the action plan unit 43 makes the touch panel 23 display a notification that instructs the user to stop the vehicle V, in a case where the action plan unit 43 extracts the at least one parking available position in the above obtaining processing. At this time, the action plan unit 43 may make the touch panel 23 also display a notification that instructs the user to change a position of the shift lever 11D to the parking position after the vehicle V has stopped.

Next, the action plan unit 43 makes the touch panel 23 display the current position of the vehicle V and the at least one parking available position. At this time, the action plan unit 43 may make the touch panel 23 display the current position of the vehicle V and the at least one parking available position on the image obtained by the external cameras 18. Thereafter, the action plan unit 43 makes the touch panel 23 display a notification that instructs the user to select the parking position from the at least one parking available position. When the user inputs a desired parking position to the touch panel 23, the touch panel 23 outputs a signal corresponding to the inputted parking position to the action plan unit 43. At this time, the action plan unit 43 may identify the desired parking position based on a position where the user touches the touch panel 23. At this time, the action plan unit 43 makes the touch panel 23 display a button for the user to select a parking direction (a forward parking direction or a backward parking direction). At this time, the action plan unit 43 may simply compute a pair of routes from the current position of the vehicle V to the parking position such that each route corresponds to the forward parking direction or the backward parking direction, and may make the touch panel 23 display the pair of routes. In such a case, the touch panel 23 may permit the user to select the parking direction by touching one of the pair of routes, and may output the selection result (namely, selected parking direction) to the action plan unit 43.

Next, when the action plan unit 43 receives the parking position inputted by the user from the touch panel 23, the action plan unit 43 executes trajectory computation processing to compute a trajectory of the vehicle V from the current position to the parking position. In a case where the user performs the input to select the parking direction, the action plan unit 43 may compute the trajectory of the vehicle V based on not only the current position and the parking position but also the parking direction selected by the user.

When the computation of the trajectory of the vehicle V is completed, the action plan unit 43 makes the touch panel 23 display a notification that urges the user to get off the vehicle V and a notification that instructs the user to start dedicated application software for the remote parking processing (hereinafter referred to as "remote parking application") in the operation terminal 3. According to these notifications, the user gets off the vehicle V, and then starts the remote parking application in the operation terminal 3.

Thereafter, the input/output unit 30 of the operation terminal 3 displays an input button to connect the operation terminal 3 to the vehicle V and to start the authentication of the operation terminal 3. When the user operates (for example, touches or pushes) the input button, the operation terminal 3 is connected to the vehicle V and the action plan unit 43 executes terminal authentication processing to execute the authentication of the operation terminal 3 connected to the vehicle V. In the terminal authentication processing, the operation terminal 3 sends the action plan unit 43 an authentication request signal that includes the terminal ID of the operation terminal 3, and the action plan unit 43 executes the authentication (determination) of the operation terminal 3 based on the terminal ID of the operation terminal 3. When the action plan unit 43 succeeds in the authentication of the operation terminal 3, the action plan unit 43 sends a signal to notify authentication success to the operation terminal 3, and then the input/output unit 30 of the operation terminal 3 displays the current position, trajectory, and parking position of the vehicle V and a vertical arrow. Thereby, the user can instruct the action plan unit 43 to execute the remote parking processing by performing the input to the input/output unit 30 of the operation terminal 3. The remote parking processing includes moving processing to move the vehicle V from the current position to the parking position and parking processing to park the vehicle V at the parking position.

When the user swipes (operates) the vertical arrow displayed on the input/output unit 30 of the operation terminal 3, the operation terminal 3 sends an operation amount signal corresponding to a swipe amount (operation amount) of the vertical arrow to the action plan unit 43. The action plan unit 43 converts the operation amount signal into a moving amount of the vehicle V and executes the moving processing to move the vehicle V along the trajectory by the computed moving amount until the vehicle V reaches the parking position. In the moving processing, the action plan unit 43 sends the traveling control instruction to the traveling control unit 44, and sends the current position of the vehicle V to the operation terminal 3.

During this moving processing, the action plan unit 43 determines whether the vehicle V has reached the parking position. When the action plan unit 43 determines that the vehicle V has reached the parking position, the action plan unit 43 executes the parking processing to park the vehicle V. In this parking process, the action plan unit 43 first sends a stopping control instruction to the traveling control unit 44 to activate the brake device 5. Thereafter, the action plan unit 43 activates the parking brake device 5A. When the parking processing is completed, the action plan unit 43 sends a notification of parking completion, which indicates that the parking processing has been completed, to the operation terminal 3.

When the operation terminal 3 receives the notification of parking completion, the input/output unit 30 of the operation terminal 3 displays a notification to indicate that the parking of the vehicle V has been completed, and the operation terminal 3 ends the remote parking application. Thereby, the parking assist processing is completed.

In the following, the following matters 1-2 in the above remote parking processing are described with reference to FIGS. 1, 4, and 5A to 5D.
1. the specific operation of the operation terminal 3 by the user
2. the control of the vehicle V and the response to the operation terminal 3 by the control device 15 that has received a signal corresponding to the specific operation from the operation terminal 3.

Incidentally, the present embodiment can be widely applied to not only the remote parking processing but also moving processing of the vehicle V from an arbitrary initial position to an arbitrary stop position within a range that can be monitored by the user (for example, moving processing to move a parked vehicle V to a position where the user will get on the vehicle V). In light of the foregoing, "the current position", "the parking position", and "the parking processing" in the above descriptions are referred to as "the initial position", "the stop position", and "the moving processing" in the following descriptions, respectively.

The stop position can be input not only from the touch panel 23 of the HMI 13 but also from the input/output unit 30 (touch panel) of the operation terminal 3. The processing unit 33 makes the input/output unit 30 display an input screen on which the user inputs the stop position, and sends information about the stop position input by the user to the control device 15. For example, there may be a case where the user wants to move the vehicle V parked at a position with no space to open/close the doors on the left and right. In such a case, the user can input one of the following positions 1-3 as the stop position.
1. a position where the vehicle V moves forward or backward by vehicle length or so
2. a position where the user has alighted from the vehicle V to park it
3. a position where the vehicle V moves forward or backward so that the control device 15 can determine that the doors can be opened/closed based on information obtained by the external environment sensor 7.

In this way, the user can identify the stop position without entering the vehicle V, so that the vehicle control system 1 can be more convenient for the user.

The user can start the movement of the vehicle V by operating the input/output unit 30 of the operation terminal 3 from outside the vehicle V. The input/output unit 30 displays an acceptance area 61 that accepts a prescribed repetitive operation performed by the user. For example, the acceptance area 61 is defined by an icon of an arrow pointing up and down. When the user starts the repetitive operation of sliding an operation part 62 up and down on the acceptance area 61 (step ST11, FIG. 5A), the control device 15 receives the signal of the repetitive operation and starts the movement of the vehicle V along the trajectory (step ST12). The operation part 62 is a part that can be moved by the user according to his/her own will, and consists of a user's finger or a stylus, for example. As long as the user continues the repetitive operation, the movement of the vehicle V continues.

In other embodiments, the repetitive operation by the user may be a sliding operation of the operation part 62 on the acceptance area 61 by reciprocating the operation part 62 in the lateral or diagonal direction or rotating the operation part 62, a flick operation of the operation part 62 on the acceptance area 61, or a repetitive operation in which the operation part 62 repeatedly abuts against and separates from a part of the acceptance area 61. The shape of the icon defining the acceptance area 61 is not limited as long as the icon can indicate the position of the acceptance area 61. Preferably, the icon includes an arrow indicating the directions of the repetitive operation.

After step ST12, the action plan unit 43 of the control device 15 determines whether the repetitive operation by the user is stopped (step ST13). When the action plan unit 43 determines that the repetitive operation by the user is continued (when the determination in step ST13 is No), the action plan unit 43 determines whether the vehicle V has reached the stop position based on the information from the external environment sensor 7 and the navigation device 10 and the position of the vehicle V identified by the vehicle position identifying unit 42 (step ST14). When the action plan unit 43 determines that the vehicle V has not reached the stop position (when the determination in step ST14 is No), the action plan unit 43 returns to step ST13 and makes the traveling control unit 44 continue moving the vehicle V along the trajectory. On the other hand, when the action plan unit 43 determines that the vehicle V has reached the stop position (when the determination in step ST14 is Yes), the action plan unit 43 makes the traveling control unit 44 stop the vehicle V (step ST15).

Figure 5D:
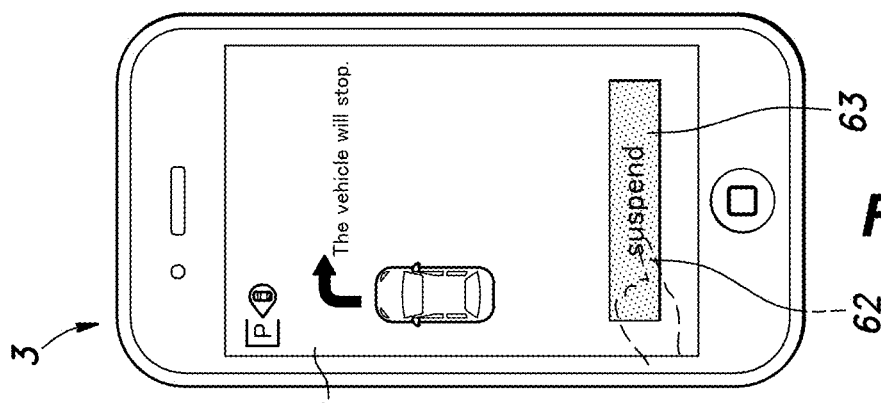
FIG. 5D is an explanatory diagram showing a screen displayed on an operation terminal in the vehicle control system according to the embodiment of the present invention.
Figure 5C:
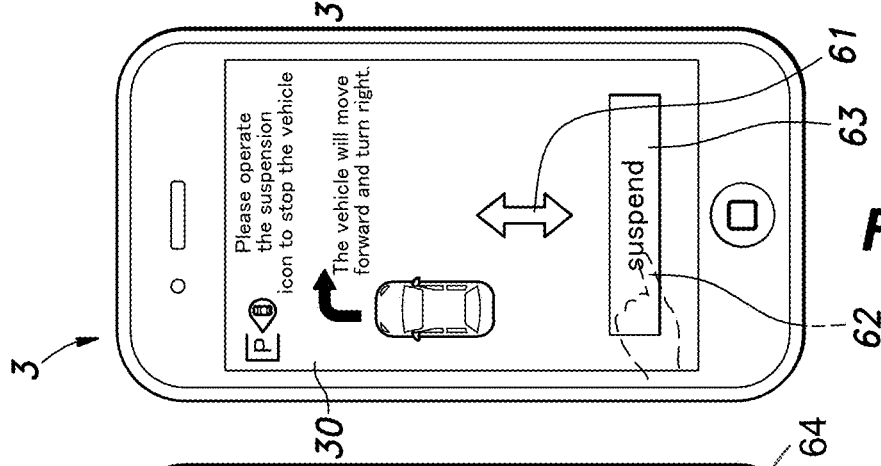
FIG. 5C is an explanatory diagram showing a screen displayed on an operation terminal in the vehicle control system according to the embodiment of the present invention.
Figure 5B:
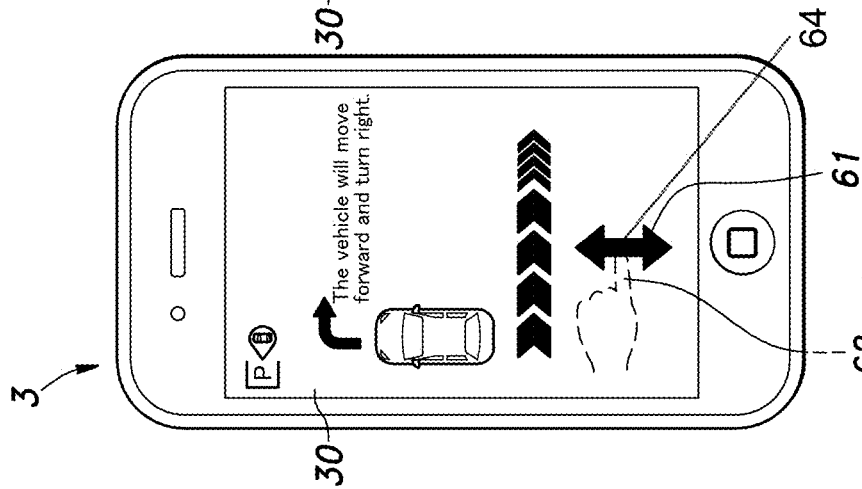
FIG. 5B is an explanatory diagram showing a screen displayed on an operation terminal in the vehicle control system according to the embodiment of the present invention.

When the action plan unit 43 determines that the repetitive operation by the user is stopped before the vehicle V reaches the stop position (when the determination in step ST13 is Yes, FIG. 5B), the action plan unit 43 sends a signal, which makes the input/output unit 30 display a suspension icon 63, to the operation terminal 3. When the operation terminal 3 receives this signal, the processing unit 33 makes the input/output unit 30 display the suspension icon 63 (step ST16), and also makes the input/output unit 30 display that the vehicle V will stop if the suspension icon 63 is operated (FIG. 5C). At this time, the vehicle V keeps on moving. The action plan unit 43 determines that the repetitive operation by the user is stopped when the operation part 62 that has slid on the input/output unit 30 is stopped on or separates from the input/output unit 30. Incidentally, the time when the operation part 62 is stopped on the input/output unit 30 is, for example, the time when the moving distance of the operation part 62 on the input/output unit 30 within a prescribed period is equal to or less than a distance corresponding to a prescribed number of pixels. In this way, the action plan unit 43 can easily determine whether the repetitive operation is stopped.

Incidentally, in a case where the repetitive operation is not a sliding operation of the operation part 62 on the acceptance area 61 of the input/output unit 30 but a repetitive operation in which the operation part 62 repeatedly abuts against and separates from the acceptance area 61, the action plan unit 43 determines that the repetitive operation is stopped when the moving distance of the operation part 62 on the input/output unit 30 within a prescribed period is equal to or less than a distance corresponding to a prescribed number of pixels or when the operation part 62 does not abut against the acceptance area 61 within a prescribed period after separating therefrom. The sliding operation is an operation to move the operation part 62 continuously on the input/output unit 30, and does not include any operation to separate the operation part 62 from the input/output unit 30. Therefore, the action plan unit 43 can determine that the repetitive operation is stopped as soon as the operation part 62 separates from the input/output unit 30.

The suspension icon 63 is displayed on the input/output unit 30 at a part 64 where the repetitive operation has been performed. In a case where the action plan unit 43 determines that the repetitive operation is stopped when the operation part 62 is stopped on the input/output unit 30, the suspension icon 63 is displayed to include a point where the operation part 62 has been stopped. On the other hand, in a case where the action plan unit 43 determines that the repetitive operation is stopped when the operation part 62 separates from the input/output unit 30, the suspension icon 63 is displayed to include a point where the operation part 62 has abutted right before separating from the input/output unit 30. In FIG. 5C, a button-shaped suspension icon 63 is shown, but the suspension icon 63 may have another shape. As shown in FIG. 5C, when the suspension icon 63 is displayed on the input/output unit 30, the processing unit 33 may make the input/output unit 30 display the icon defining the acceptance area 61 at a position different from the suspension icon 63. Alternatively, instead of displaying the icon defining the acceptance area 61, the processing unit 33 may set one of the following areas 1-3 to the acceptance area 61 after the repetitive operation is stopped. 1. an area the same as the acceptance area 61 before the repetitive operation is stopped 2. a whole area of the input/output unit 30 3. a whole area of the input/output unit 30 other than an area where the suspension icon 63 is displayed.

Figure 5A:
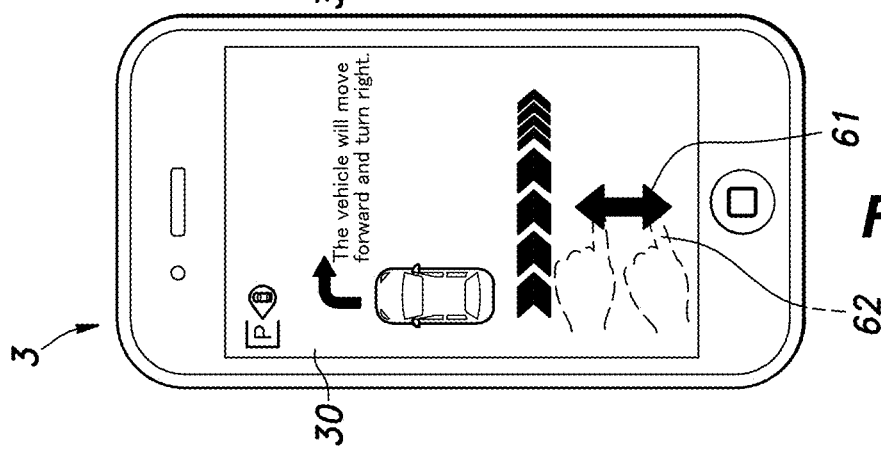
FIG. 5A is an explanatory diagram showing a screen displayed on an operation terminal in the vehicle control system according to the embodiment of the present invention.

After step ST16, the action plan unit 43 determines whether the repetitive operation by the user is resumed (step ST17). When the action plan unit 43 determines that the repetitive operation by the user is resumed (when the determination in step ST17 is Yes), as in a case where the action plan unit 43 determines that the repetitive operation by the user is continued, the action plan unit 43 makes the traveling control unit 44 continue moving the vehicle V and determines whether the vehicle V has reached the stop position (step ST14). When the action plan unit 43 determines that the repetitive operation by the user is not resumed (when the determination in step ST17 is No), the action plan unit 43 determines whether the suspension icon 63 is operated to stop the vehicle V (step ST18). When the action plan unit 43 determines that the suspension icon 63 is not operated to stop the vehicle V (when the determination in step ST18 is No), the action plan unit 43 determines whether a prescribed period has elapsed after the repetitive operation has been stopped (step ST19). When the action plan unit 43 determines that the suspension icon 63 is operated to stop the vehicle V (when the determination in step ST18 is Yes, FIG. 5D) or when the action plan unit 43 determines that the prescribed period has elapsed after the repetitive operation has been stopped (when the determination in step ST19 is Yes), the action plan unit 43 makes the traveling control unit 44 stop the vehicle V to suspend the movement of the vehicle V (step ST20). Further, the action plan unit 43 makes the input/output unit 30 display the stop of the vehicle V. Thereafter, as shown in FIG. 5A, the input/output unit 30 deletes the suspension icon 63 and displays the icon defining the acceptance area 61, and the action plan unit 43 waits for the repetitive operation to be resumed (step ST11).

After the action plan unit 43 determines that the repetitive operation is stopped for the reason that the operation part 62 is stopped on the input/output unit 30, the action plan unit 43 determines that the suspension icon 63 is operated when the operation part 62 abuts against the suspension icon 63 after separating from the input/output unit 30 or when pressure applied to the suspension icon 63 by the operation part 62 increases. Also, after the action plan unit 43 determines that the repetitive operation is stopped for the reason that the operation part 62 separates from the input/output unit 30, the action plan unit 43 determines that the suspension icon 63 is operated when the operation part 62 abuts against the suspension icon 63. In this way, it is possible to easily determine whether the suspension icon 63 is operated.

Within the prescribed period after the repetitive operation has been stopped (the determination in step ST19 is No), the action plan unit 43 accepts the resumption of the repetitive operation (step ST17) and the operation of the suspension icon 63 (step ST18) while the vehicle V keeps on moving.

In the present embodiment, the control device 15 determines whether the repetitive operation is continued, stopped, or resumed and whether the suspension icon 63 is operated, based on a signal sent from the operation terminal 3 to the control device 15 (a signal corresponding to the input by the operation part 62 to the input/output unit 30). In other embodiments, the processing unit 33 of the operation terminal 3 may make these determinations and send the determination results to the control device 15.

By performing the above processing, when the user stops the repetitive operation even though the user does not intend to stop the vehicle V, the user can continue the moving processing without stopping the vehicle V by resuming the repetitive operation before the prescribed period elapses. Also, when the user stops the repetitive operation with the intent to stop the vehicle V, the user can immediately stop the vehicle V by operating the suspension icon 63. Further, when the user becomes unable to operate the operation terminal 3 (for example, when the user drops the operation terminal 3), the vehicle V stops after the prescribed period elapses, so that it is possible to prevent the vehicle V from colliding with the obstacle and to perform the moving processing safely. Also, when the user does not perform the repetitive operation, the vehicle V stops after the prescribed period elapses, so that it is possible to urge the user to stay around the vehicle V to monitor it.

Concrete embodiments of the present invention have been described in the foregoing, but the present invention should not be limited by the foregoing embodiments and various modifications and alterations are possible within the scope of the present invention. The user holding the operation terminal 3 and monitoring the remote autonomous moving processing (remote parking processing) outside the vehicle V may be a driver, an occupant other than the driver, or a person other than the occupant.

The invention claimed is:

1. A vehicle control system, comprising:
    a terminal configured to be carried by a user; and
    a control device configured to execute remote autonomous moving processing to move a vehicle from an initial position to a stop position and to stop the vehicle at the stop position in response to an instruction from the terminal,
    wherein the terminal includes:
    a touch panel configured to display an acceptance area that accepts a prescribed repetitive operation performed for continuing moving of the vehicle by the remote autonomous moving processing and to display a suspension icon that accepts an operation performed for stopping the vehicle during the remote autonomous moving processing;
    a processing unit configured, in the response to operations on the touch panel by the user after the moving of the vehicle by the remote autonomous moving processing is started, to make the touch panel display the suspension icon at a part of the touch panel where the repetitive operation has been performed when the repetitive operation is stopped,
    wherein, within a prescribed period after the repetitive operation has been stopped, the control device or the terminal determines whether the repetitive operation is resumed and whether the suspension icon is operated while the vehicle keeps on moving, and
    after the repetitive operation is stopped and when the control device or the processing unit determines that the suspension icon is operated or that the repetitive operation is not resumed within the prescribed period after the repetitive operation has been stopped, the control device starts control to stop the vehicle.

2. The vehicle control system according to claim 1, wherein the processing unit is configured to make the touch panel display an input screen on which the user inputs the stop position, and to send information about the stop position input by the user to the control device.

3. The vehicle control system according to claim 1, wherein the repetitive operation is a sliding operation on the touch panel by an operation part moved by the user.

4. The vehicle control system according to claim 3, wherein the control device or the processing unit determines that the repetitive operation is stopped when the operation part is stopped on the touch panel, and then determines that the suspension icon is operated when the operation part abuts against the suspension icon after separating from the touch panel or when pressure applied to the suspension icon by the operation part increases.

5. The vehicle control system according to claim 3, wherein the control device or the processing unit determines that the repetitive operation is stopped when the operation part separates from the touch panel, and then determines that the suspension icon is operated when the operation part abuts against the suspension icon.

* * * * *